United States Patent
Haimes

(10) Patent No.: US 11,887,037 B2
(45) Date of Patent: Jan. 30, 2024

(54) GENERATING AND APPLYING A PREDICTION MODEL BASED ON BLOCKCHAIN DATA

(71) Applicant: Oracle International Corporation, Redwood Shores, CA (US)

(72) Inventor: David Joseph Haimes, Belmont, CA (US)

(73) Assignee: Oracle International Corporation, Redwood Shores, CA (US)

(*) Notice: Subject to any disclaimer, the term of this patent is extended or adjusted under 35 U.S.C. 154(b) by 1104 days.

(21) Appl. No.: 16/279,708

(22) Filed: Feb. 19, 2019

(65) Prior Publication Data

US 2020/0265352 A1 Aug. 20, 2020

(51) Int. Cl.
| | |
|---|---|
| G06Q 20/38 | (2012.01) |
| G06Q 40/12 | (2023.01) |
| G06Q 40/02 | (2023.01) |
| H04L 9/06 | (2006.01) |
| G06N 20/00 | (2019.01) |
| G06Q 10/067 | (2023.01) |
| G06Q 10/0631 | (2023.01) |
| H04L 9/00 | (2022.01) |

(52) U.S. Cl.
CPC .......... *G06Q 10/067* (2013.01); *G06N 20/00* (2019.01); *G06Q 10/06315* (2013.01); *G06Q 20/382* (2013.01); *G06Q 40/12* (2013.12); *H04L 9/0637* (2013.01); *H04L 9/0643* (2013.01); *G06Q 40/02* (2013.01); *G06Q 2220/00* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 10,929,931 B1* | 2/2021 | Bryant | G06Q 40/08 |
| 2015/0142545 A1* | 5/2015 | Ceribelli | G06Q 30/0224 |
| | | | 705/14.23 |
| 2018/0357559 A1* | 12/2018 | Truong | G06N 20/00 |
| 2019/0043138 A1* | 2/2019 | Blake | G06Q 20/10 |
| 2019/0130014 A1* | 5/2019 | Zhang | G06N 7/01 |
| 2019/0228397 A1* | 7/2019 | Madden | G06Q 20/3223 |
| 2020/0134745 A1* | 4/2020 | McLinden | G06Q 10/06313 |

\* cited by examiner

*Primary Examiner* — Chrystina E Zelaskiewicz
(74) *Attorney, Agent, or Firm* — Invoke

(57) ABSTRACT

Generating and applying a prediction model based on blockchain data is disclosed. Based on blockchain data related to historical invoices, a prediction model is generated using machine learning. The prediction model is used to generate a recommendation for a particular entity to obtain a target funding amount by a target funding date. The prediction model is applied to the particular entity's outstanding invoices. Based on blockchain data related to the outstanding invoices, the prediction model determines a predicted cost that the particular entity would incur in obtaining funding, by the target funding date, using each outstanding invoice. A funding type to be used for each invoice is also identified. Invoices are selected based on the predicted costs. An interface presents the recommendation to use the selected invoices to obtain the target funding amount by the target funding date.

29 Claims, 9 Drawing Sheets

Table 600

| Funding Type | Amount Due | Predicted Amount Obtained | Predicted Cost |
|---|---|---|---|
| Regular Payment | 55,000 | 55,000 | 0 |
| Early Payment | 60,000 | 56,400 | 3,600 |
| Sale | 80,000 | 73,600 | 6,400 |
| Sub-Total | 195,000 | 185,000 | 10,000 |
|  |  |  |  |
| Line of Credit |  | 15,000 | 1,500 |
|  |  |  |  |
| Grand Total |  | 200,000 | 11,500 |

Target Funding Amount 602

FIG. 6

GENERATING AND APPLYING A PREDICTION MODEL BASED ON BLOCKCHAIN DATA

TECHNICAL FIELD

The present disclosure relates to blockchains. In particular, the present disclosure relates to generating and applying a prediction model based on blockchain data.

BACKGROUND

Blockchain technology involves storing transaction information in blocks over a distributed system of nodes. Two attributes of blockchain technology help ensure accuracy and reliability of the transaction information: (a) linking each block with the preceding block through the use of a hash to form a chain (also referred to as a "blockchain") and (b) storing the same blockchain on each node (also referred as to as "blockchain nodes").

Each block is linked to the preceding block through the use of a hash. Specifically, each block stores both the hash of the preceding block and the hash of itself. Any change in data within a block changes the block's hash. Hence, any change in a block's data will cause a mismatch between the block's data and the block's hash, which would invalidate the block. Any change in a block's hash will cause a mismatch between the block's hash as stored in the block itself and the block's hash as stored in the following block, which would invalidate the block. Therefore it is not possible to change the data of any individual block, without changing the data of all following blocks.

A blockchain is maintained by a large number of nodes. Each node stores the same version of the blockchain at any given time. Any change in data in a particular copy of the blockchain stored on one node will cause a mismatch between the particular copy and other copies of the blockchain stored on other nodes, which would invalidate the particular copy of the blockchain. Therefore it is not possible to change the data of any individual copy of the blockchain stored by a particular node, without changing all copies of the blockchain stored by the remaining nodes.

Blockchain technology allows entities (such as corporations, organizations, and/or persons) to perform various transactions on a blockchain. Since the blockchain is updated as the transactions are conducted, blockchain data reflects real-time real-world transactions.

Each node stores a copy of a blockchain ledger. A blockchain ledger includes (a) a log of the transactions performed by the entities and/or (b) states associated with the entities after performance of the transactions. States may keep track of any type of information associated with an entity, such as an amount of funds in an account of the entity, a number of cars owned by the entity, a location of a package shipped by the entity, and/or a status (such as, issued, paid, overdue) of an invoice issued by the entity.

Additionally, each node stores a copy of a smart contract used for conducting a transaction. A smart contract includes a set of code configured to determine and/or commit a resulting state that is obtained through performance of a transaction. The smart contract may include code verifying certain conditions prior to determining and/or committing the resulting state. As an example, CarSeller may propose a transaction that issues an invoice for the sale of a car to CarBuyer. A smart contract may include code verifying that CarBuyer previously accepted an offer for the car. The smart contract may further include code verifying that an inventory of CarSeller (which is also maintained on the blockchain) includes the car. Upon successful verification, the invoice may be committed on the blockchain, thereby indicating that CarBuyer owes a certain amount of money to CarSeller.

In an embodiment, an entity may have a certain number of outstanding invoices, which were issued on a blockchain. However, the entity may need a target funding amount by a target funding date, which is before the due dates on at least some of the outstanding invoices. The entity may obtain funding on an invoice prior to the invoice due date through various methods (the various methods of obtaining funding using an invoice may be referred to herein as "funding types"). One example method for obtaining funding using an invoice is to request early payment from a debtor at a discount price. Another example method for obtaining funding using an invoice is to sell the invoice to a third party at a certain loss (also referred to as "invoice factoring"). However, given a large number of invoices, and a large number of potential parties (such as debtors willing to pay early, and/or third parties willing to purchase), an entity may face difficulty in determining which funding type to use for which invoice.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 6 shows a table that illustrates example predicted costs for various funding types, in accordance with one or more embodiments;

DETAILED DESCRIPTION

Figure 1A:
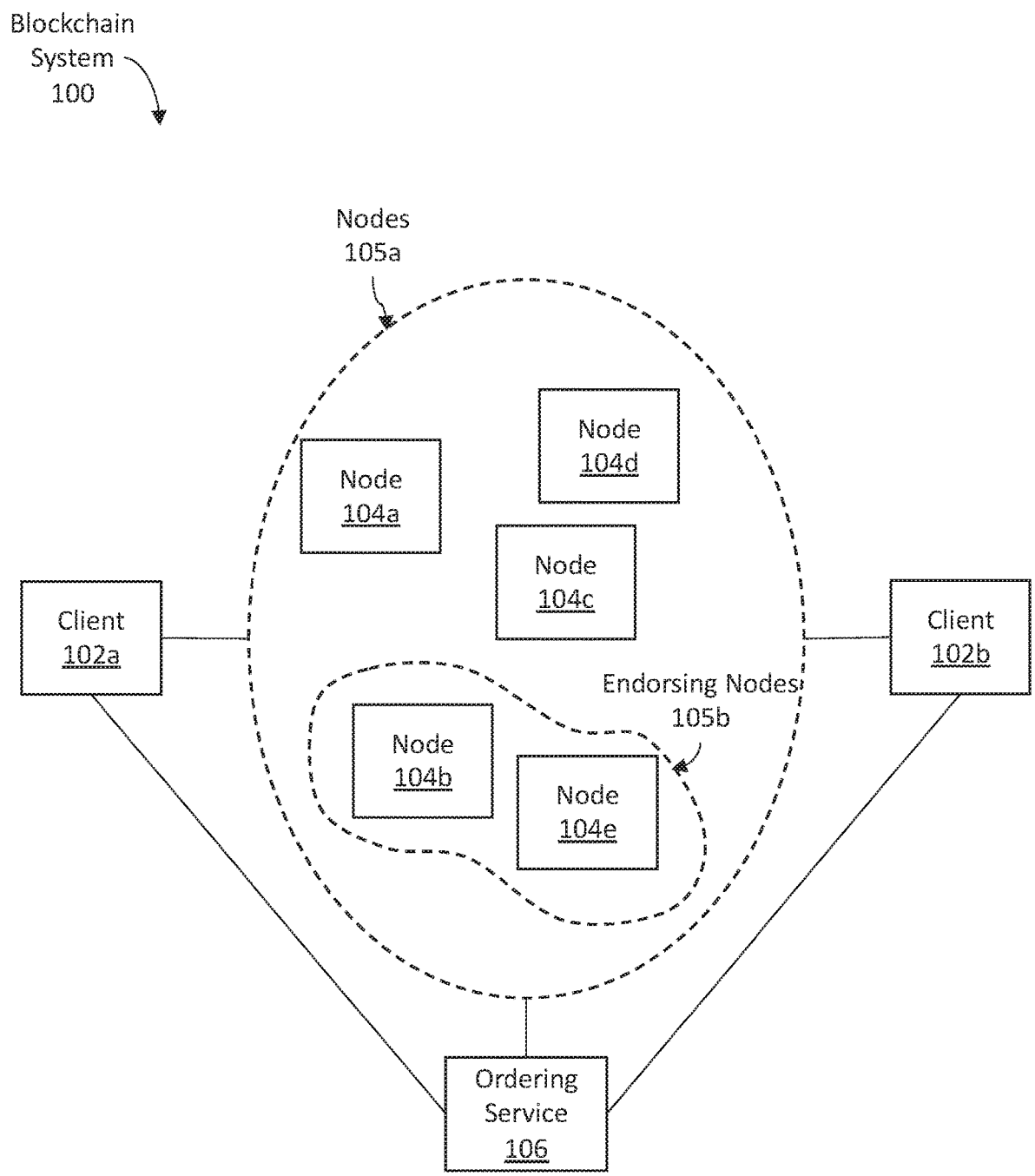
FIG. 1A illustrates an example blockchain system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.
1. GENERAL OVERVIEW
2. BLOCKCHAIN AND PREDICTION SYSTEM ARCHITECTURE
3. GENERATING A PREDICTION MODEL BASED ON BLOCKCHAIN DATA
4. APPLYING A PREDICTION MODEL BASED ON BLOCKCHAIN DATA
5. EXAMPLE EMBODIMENT
6. HARDWARE OVERVIEW
7. MISCELLANEOUS; EXTENSIONS

1. General Overview

One or more embodiments include using blockchain data to train a prediction model to determine a lowest predicted cost for obtaining funding using an invoice and an associated funding type. As described above, due to the nature of blockchain technology, blockchain data (a) is reliable and accurate and (2) reflects real-time transactions. Further, given that many parties related to a transaction may utilize the blockchain, blockchain data includes information associated with a diverse array of sources. Hence, blockchain data provides a rich pool of data, for training a prediction model, which was not previously available. One or more machine learning algorithms are applied to the blockchain data to generate a prediction model. The prediction model determines a lowest predicted cost for obtaining funding using an invoice. The funding type associated with the lowest predicted cost is also determined.

One or more embodiments include applying a prediction model to blockchain data to determine a lowest predicted cost for obtaining funding using an invoice and an associated funding type. A blockchain node stores information associated with a number of outstanding invoices of a particular entity. The particular entity desires to obtain a target funding amount by a target funding date using the outstanding invoices. A prediction model is applied to each outstanding invoice to determine which funding type would result in the lowest cost for obtaining funds using the invoice. The outstanding invoices are ranked based on the respective predicted cost. Outstanding invoices (a) associated with the lowest predicted cost (relative to other outstanding invoices), and (b) totaling an amount equal to or greater than the target funding amount, are selected. A recommendation for obtaining the target funding amount by the target funding date is generated. The recommendation indicates the funding type, determined by the prediction model, for each selected outstanding invoice. A user interface presents the recommendation to the particular entity. Hence, the particular entity obtains a reliable recommendation for obtaining the target funding amount by the target funding date at a lowest cost to the particular entity. The recommendation is provided at a granular level, indicating (a) a funding amount to be obtained through each funding type, and/or (b) a funding type to be used for each outstanding invoice, to obtain the target funding amount at a lowest cost.

One or more embodiments described in this Specification and/or recited in the claims may not be included in this General Overview section.

2. Blockchain and Prediction System Architecture

FIG. 1A illustrates an example blockchain system, in accordance with one or more embodiments. As illustrated in FIG. 1A, a system 100 includes one or more clients 102a-b, a set of nodes 105a (such as, nodes 104a-e), and an ordering service 106. In one or more embodiments, the system 100 may include more or fewer components than the components illustrated in FIG. 1A. The components illustrated in FIG. 1A may be local to or remote from each other. The components illustrated in FIG. 1A may be implemented in software and/or hardware. Each component may be distributed over multiple applications and/or machines. Multiple components may be combined into one application and/or machine. Operations described with respect to one component may instead be performed by another component.

In one or more embodiments, a client (such as any of clients 102a-b) requests a transaction, associated with a particular smart contract, to be written to a blockchain ledger. A process of requesting a transaction to be written may involve multiple phases. In a first phase, a client proposes a transaction to a set of endorsing nodes 105b. In a second phase, a client transmits the transaction to an ordering service 106, so that the transaction will be committed to a blockchain ledger.

In one or more embodiments, a set of nodes 105a maintains a blockchain ledger. A set of nodes 105a commits transactions to the blockchain ledger. Additionally or alternatively, the set of nodes 105a stores states, corresponding to committed transactions, in the blockchain ledger. The transactions and/or states stored in a blockchain ledger may pertain to one or more smart contracts. A set of nodes 105a may maintain a blockchain ledger in accordance with a particular blockchain system or framework, such as Hyperledger Fabric. Additional details regarding the set of nodes 105a is described below with reference to FIG. 1B.

In one or more embodiments, at least a subset of the nodes 105a may be endorsing nodes 105b for a particular smart contract. An endorsing node (such as any of node 104b or node 104e) endorses a transaction proposed by a client 102. A process of endorsing a transaction may involve multiple phases. In a first phase, an endorsing node simulates the transaction by determining a resulting state after performance of the transaction. In a second phase, an endorsing node generates a message including (a) the resulting state and (b) a signature of the endorsing node.

In one or more embodiments, an ordering service 106 generates and delivers blocks to be committed to a blockchain ledger. An ordering service 106 receives transactions to be committed from one or more clients 106. The ordering service 106 determines a particular order for the transactions. The ordering service 106 groups the ordered transactions into a block. The ordering service 106 determines a hash of the previously-generated block, and a hash of the currently-generated block. The ordering service 106 stores both hashes into the block. The ordering service 106 delivers the block to a set of nodes 105a for commitment.

In an embodiment, each of clients 102a-b, nodes 104a-e, and/or an ordering service 106 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, a personal digital assistant (PDA).

Figure 1B:
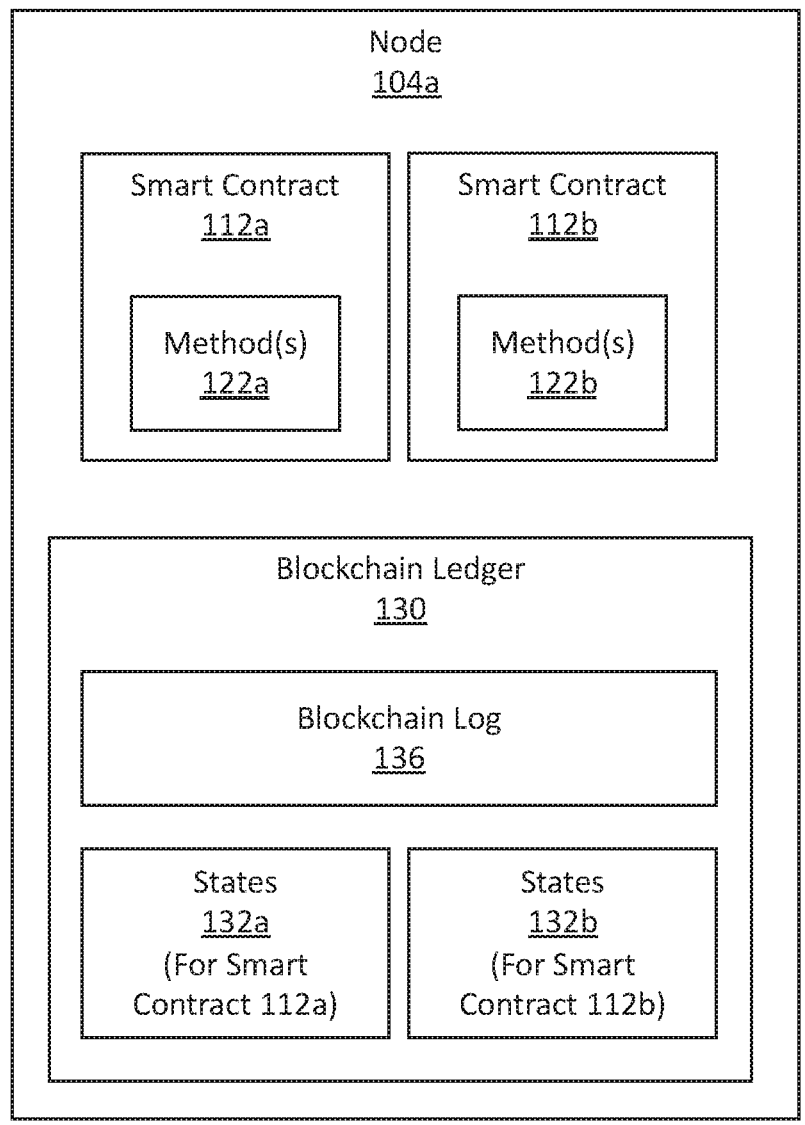
FIG. 1B illustrates an example blockchain node, in accordance with one or more embodiments.

FIG. 1B shows a block diagram of a blockchain node that maintains a blockchain ledger, in accordance with one or more embodiments. As illustrated, a node (such as node 104a of FIG. 1A) includes one or more smart contracts 112a-b, and a blockchain ledger 130. A blockchain ledger 130 includes a blockchain log 136, and one or more states 132a-b (associated with one or more smart contracts 112a-b).

In one or more embodiments, a smart contract (such as any of smart contracts 112a-b) is a set of code that includes one or more methods (such as any of methods 122a-b) that may be executed to perform a transaction using blockchain technology. The same smart contract is stored across multiple nodes (such as endorsing nodes 105b of FIG. 1A).

A method (such as any of methods 122a-b) of a smart contract includes operations for determining a new state, to be committed to a blockchain ledger 130, based on a particular transaction. Information associated with the transaction may be specified using parameters for the method. The method may perform operations upon a current state stored in the blockchain ledger 130. Executing the method to determine the new state, without committing the new state to the blockchain ledger 130, may be referred to herein as "simulating" the transaction. Once the new state is written or committed to the blockchain ledger 130, the transaction is considered as "performed" or "completed."

As an example, a current state in a blockchain ledger may indicate that Janet's account has 1,000 stocks in Boom Company. A transaction to be performed may be to add 500 stocks in Boom Company to Janet's account. A method for adding stocks to an account may be invoked. Parameters for the method may specify the number of stocks to be added (500) and the account at issue (Janet's account). The method may obtain the current state of Janet's account, which indicates that there are 1,000 stocks. The method may add the 500 stocks to the current state, resulting in 1,500 stocks. The method may return a new state, indicating that Janet's account would have 1,500 stocks based on the transaction. In this example, the method simulates the transaction by determining that Janet's account would have 1,500 stocks after the transaction.

In an embodiment, a smart contract includes code that represents terms agreed upon by two or more parties. As an example, one party may be a car seller. Another party may be a car buyer. The parties may agree to a price of $100,000. A smart contract may include a method for changing ownership of a car from the car seller to the car buyer. The method includes code that triggers the change of ownership if an amount of $100,000 is received by the car seller from the car buyer. Hence, the smart contract includes code that represents the agreed upon price of $100,000.

In one or more embodiments, a blockchain ledger 130 includes a blockchain log 136 and/or a record of states (such as states 132a-b). Information in the blockchain ledger 130 is stored in blocks. As described above, each block is linked to the preceding block through the use of a hash. Specifically, each block stores both the hash of the preceding block and the hash of itself.

A blockchain log 136 stores transactions that have been committed in a blockchain. The transactions may be performed based on one or more smart contracts 112a-b.

A record of states stores states determined based on committed transactions. As illustrated, for example, states 132a are determined based on committed transactions of smart contract 112a; and states 132b are determined based on committed transactions of smart contract 112b. In an embodiment, a state created and/or modified by a particular smart contract is scoped exclusively to that particular smart contract. The state cannot be accessed directly by another smart contract. However, given the appropriate permissions, a particular smart contract may invoke another smart contract to access a state associated with the other smart contract.

States may be stored using any of a variety of data structures, such as key-value pairs. Each state may be associated with a version identifier. Each time a state is modified, the associated version identifier is incremented.

As an example, a record of states, of a blockchain ledger, may initially indicate the amount of money owned by John and the amount of money owned by Mary. The record of states may include: "Key: John; Value: $100, version 12" and "Key: Mary; Value: $300, version 53." A transaction may be performed on Jan. 1, 2018, to transfer $50 from Mary to John. A blockchain log, of the blockchain ledger, may be updated to include the transaction: "Jan. 1, 2018; from Mary; to John; $50." The record of states may be updated to include: "Key: John; Value: $150, version 13" and "Key: Mary; Value: $250, version 54."

In one or more embodiments, a data repository (not illustrated) is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site.

A data repository may store information describing one or more smart contracts 112a-b, and a blockchain ledger 130. A data repository may be implemented or may execute on the same computing system as a node 104a. Alternatively or additionally, a data repository may be implemented or executed on a computing system separate from a node 104a. The data repository may be communicatively coupled to the node 104a via a direct connection or via a network.

Figure 2:
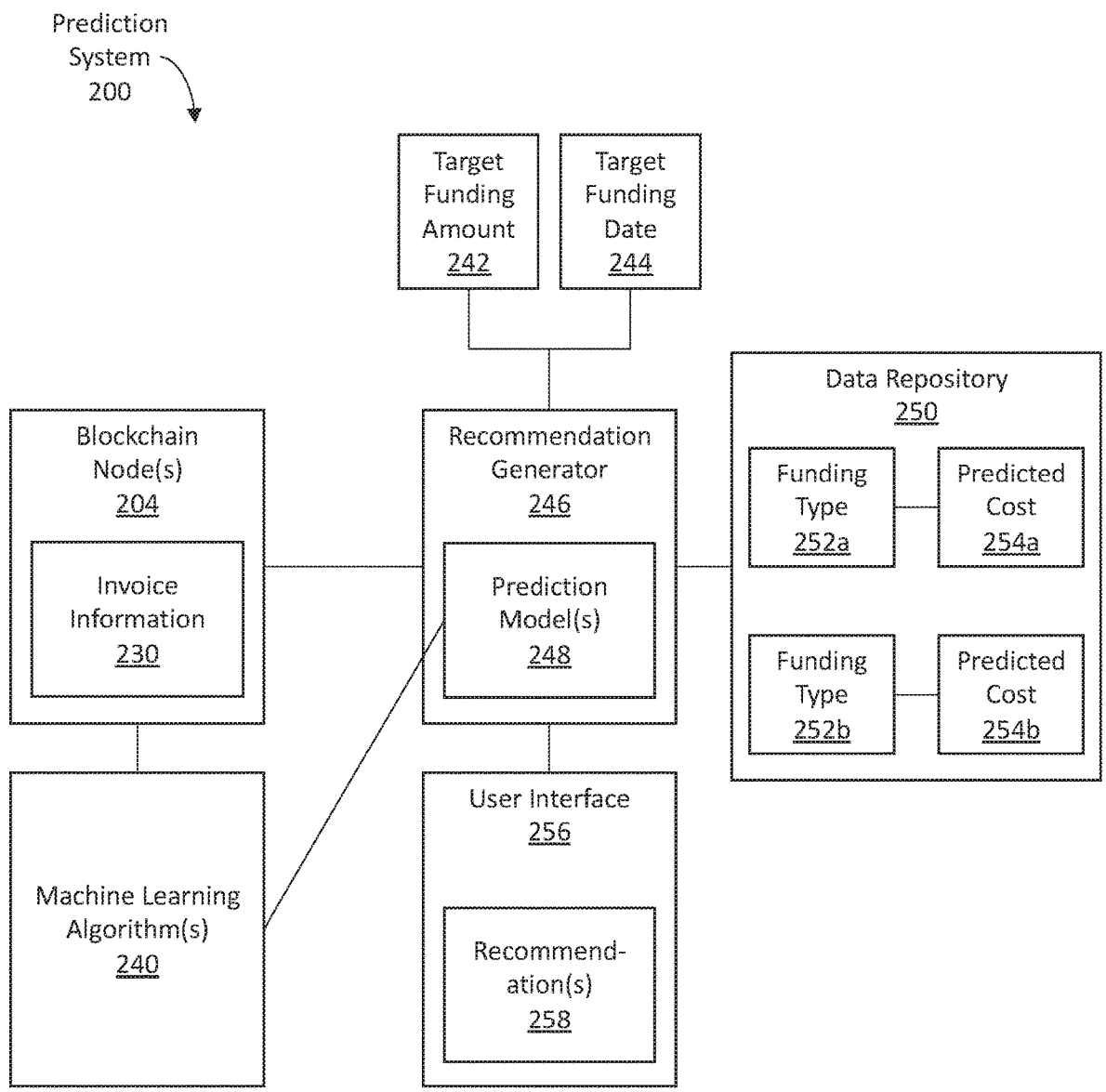
FIG. 2 illustrates an example prediction system, in accordance with one or more embodiments.

FIG. 2 illustrates an example prediction system, in accordance with one or more embodiments. As illustrated in FIG. 2, a system 200 includes one or more blockchain nodes 204, one or more machine learning algorithms 240, one or more prediction models 248, a target funding amount 242, a target funding date 244, a recommendation generator 246, a user interface 256, and a data repository 250. In one or more embodiments, the system 200 may include more or fewer components than the components illustrated in FIG. 2. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component.

In one or more embodiments, one or more blockchain nodes 204 (similar to node 104a of FIG. 1B, and/or any of nodes 105a of FIG. 1A) maintains a blockchain ledger (similar to blockchain ledger 130 of FIG. 1B). The blockchain ledger includes invoice information 230.

As described above, blockchain data includes information associated with a diverse array of sources, thereby providing a rich pool of data. Hence, invoice information 230 includes a wide variety of information.

Invoice information 230 includes information that is directly ascertainable from an invoice itself, such as what goods and/or services were sold on an invoice, seller information, buyer information, recipient information, purchase order(s) matched to an invoice, and/or terms of payment associated with an invoice (for example, due date, penalty date and percentage penalty, and/or early payment date and percentage discount).

Additionally or alternatively, invoice information 230 includes information that is obtained from a seller and/or buyer.

As an example, transactions conducted on a blockchain may include issuance of invoices as well as issuance of purchase orders. Even though an invoice may not explicitly identify a related purchase order, blockchain data associated with the seller and/or buyer may include past purchase orders. Based on a similarity between an invoice and a past purchase order (for example, based on goods and/or services sold, dates, quoted amount and amount due), the past purchase order may be identified as matching with the invoice. The past purchase order may be identified as invoice information related to the invoice.

As another example, blockchain data may include invoices issued and quality assurance results associated with goods sold on invoices. After an invoice is issued, and the goods are received, a buyer may conduct testing on the goods. Based on the testing, the buyer may indicate a 95% acceptance rate on the goods. The buyer may request a transaction on the blockchain that indicates the 95% acceptance rate. The acceptance rate may be identified as invoice information related to the invoice.

As another example, blockchain data may include invoices issued and buyer verifications of amounts due. After an invoice is issued, a buyer may review the amount due. The buyer may then request a transaction on the blockchain that indicates confirmation of the amount due. The buyer's confirmation may be identified as invoice information related to the invoice.

As another example, blockchain data may include information related to a credit worthiness of a buyer. The blockchain data may, for example, indicate a historic average timeliness of payments made by the buyer. Such credit information associated with a buyer may be identified as invoice information related to an invoice issued to the buyer.

Additionally or alternatively, invoice information 230 includes information obtained from third parties that are associated with a sale. As an example, a seller may issue an invoice on a blockchain to a buyer. The seller may utilize a shipping company to ship goods to a buyer. The shipping company may also be an entity associated with the blockchain. The shipping company may request transactions on the blockchain to indicate whether the goods have left the facilities, whether the goods have arrived at an intermediate location, whether the goods have arrived at the destination, and/or whether a recipient's signature was obtained. Such shipment tracking information may be identified as invoice information related to the invoice.

Additional and/or alternative types of information may also be included in invoice information 230.

In one or more embodiments, a machine learning algorithm 240 is an algorithm that can be iterated to learn a target model f that best maps a set of input variables to an output variable. A machine learning algorithm 240 may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, and/or boosting.

In an embodiment, a machine learning system (that uses machine learning algorithms 240) may be implemented or executed on the same computing system as a blockchain node 204. Alternatively or additionally, a machine learning system may be implemented or executed on a computing system separate from any blockchain nodes 204. The machine learning system may be communicatively coupled to one or more blockchain nodes 204 via a direct connection or via a network.

In one or more embodiments, a prediction model 248 is a model that best maps a set of input variables to an output variable. A prediction model 248 defines an output variable as a function of a set of input variables. The output variable is a prediction based on the set of input variables. A prediction model 248 is determined by a machine learning algorithm 240 and may be improved through iterations of the machine learning algorithm 240.

In an embodiment, a prediction model 248 indicates that is a correlation between certain attributes of invoice information 230 of an invoice and certain costs incurred in obtaining funding using the invoice. As an example, a prediction model may determine that shipment tracking information is correlated with costs. Invoice information indicating that goods of an invoice have been actually delivered may be correlated with a lower cost. Invoice information not indicating that goods of an invoice have been actually delivered may be correlated with a higher cost. As another example, a prediction model may determine that a type of goods sold on an invoice is correlated with costs. Invoice information indicating that goods sold on an invoice are necessary to the revenue generation of an entity may be correlated with a lower cost. Invoice information indicating that goods sold on an invoice are not necessary to the revenue generation of an entity may be correlated with a higher cost. As another example, a prediction model may determine that a company size of a buyer associated with an invoice is correlated with costs. The buyer is the debtor who owes money on the invoice. Invoice information indicating a buyer of a larger size may be correlated with a lower cost. Invoice information indicating a buyer of a smaller size may be correlated with a higher cost.

In an embodiment, a master prediction model may include multiple subsidiary prediction models. As an example, a master prediction model may be configured to determine which funding type would result in the lowest cost for obtaining funds using an invoice. The master prediction model may include a subsidiary prediction model for each funding type. One subsidiary prediction model may predict a cost for requesting early payment from a buyer at a discount. Another subsidiary prediction model may predict a cost for offering sale of an invoice to third parties at a loss. As illustrated, prediction model 248 may refer to a master prediction model and/or a subsidiary prediction model.

In one or more embodiments, a data repository 250 is any type of storage unit and/or device (e.g., a file system, database, collection of tables, or any other storage mechanism) for storing data. Further, a data repository 250 may include multiple different storage units and/or devices. The multiple different storage units and/or devices may or may not be of the same type or located at the same physical site. Further, a data repository 250 may be implemented or executed on the same computing system as a recommendation generator 246. Alternatively or additionally, a data repository 260 may be implemented or executed on a computing system separate from a recommendation generator 246. The data repository 260 may be communicatively coupled to the recommendation generator 246 via a direct connection or via a network.

Information describing one or more funding types 252a-b, and one or more predicted costs 254a-b, may be implemented across any of components within the system 200. However, this information is illustrated within the data repository 250 for purposes of clarity and explanation.

In one or more embodiments, a funding type (such as any of funding types 252a-b) is a method of obtaining funding. An invoice may be used to obtain funding. For example, one funding type is obtaining timely payment on an invoice. A seller may obtain funding using an invoice by obtaining timely payment on the invoice. Another funding type is obtaining early payment on an invoice. A seller may obtain funding using an invoice by obtaining early payment on the invoice. However, a buyer may demand a discount on the amount due for early payment. Hence, the discount amount is a cost to the seller for obtaining early payment. Another funding type is selling the invoice to a third party (also referred to as "invoice factoring"). A seller may obtain funding using an invoice by selling the invoice to a third party, even before the invoice is due. However, the third party may demand a lower price than the amount due on the invoice. Hence, the difference between the price and the amount due is a cost to the seller for selling the invoice to the third party. Additionally or alternatively, other sources may be used to obtain funding. For example, one funding type is obtaining a loan on a line of credit. An interest rate charged by a lender is a cost for obtaining the funds.

In one or more embodiments, a predicted cost (such as any of predicted costs 254a-b) is a cost that is predicted to be incurred if an invoice is used to obtain funding using a particular funding type. A different predicted cost may be associated with each funding type. As illustrated, for example, predicted cost 254a is determined for funding type 252a. Predicted cost 254d is determined for funding type 252d. The predicted costs are determined by one or more prediction models 248.

In one or more embodiments, a recommendation generator 246 refers to hardware and/or software configured to perform operations described herein for generating a recommendation 258 for obtaining a target funding amount 242 by a target funding date 244. The target funding amount 242 is the amount of money that a particular entity desires to raise. The target funding date 244 is the date by which the particular entity desires to obtain the target funding amount 242. Generating the recommendation 258 includes applying one or more prediction models 248 to determine predicted costs 254a-b incurred through various funding types 252a-b. Generating the recommendation 258 may further include taking into account a set of constraints and/or preferences established by the particular entity. Examples of operations for generating a recommendation 258 and determining predicted costs 254a-b are described below with reference to FIGS. 4-5.

In one or more embodiments, a user interface 256 refers to hardware and/or software configured to facilitate communications between a user and a recommendation generator 246. A user interface 256 renders user interface elements. The user interface elements may present output from the recommendation generator 246. Additionally or alternatively, the user interface elements may receive input for the recommendation generator 246. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In one or more embodiments, a user interface 256 presents one or more recommendations 258 that are generated by a recommendation generator 246. A recommendation 258 indicates a recommended financing plan, that is, one or more methods for a particular entity to obtain a target funding amount 242 by a target funding date 244. As an example, a recommendation may indicate which invoices may be used to obtain a target funding amount by a target funding date. The recommendation may further indicate which funding type to use for each individual invoice. The recommendation may further indicate a predicted cost for using the recommended funding type on each invoice. As another example, a recommendation may indicate a sum of funds that may be obtained using each funding type.

3. Generating a Prediction Model Based on Blockchain Data

Figure 3:
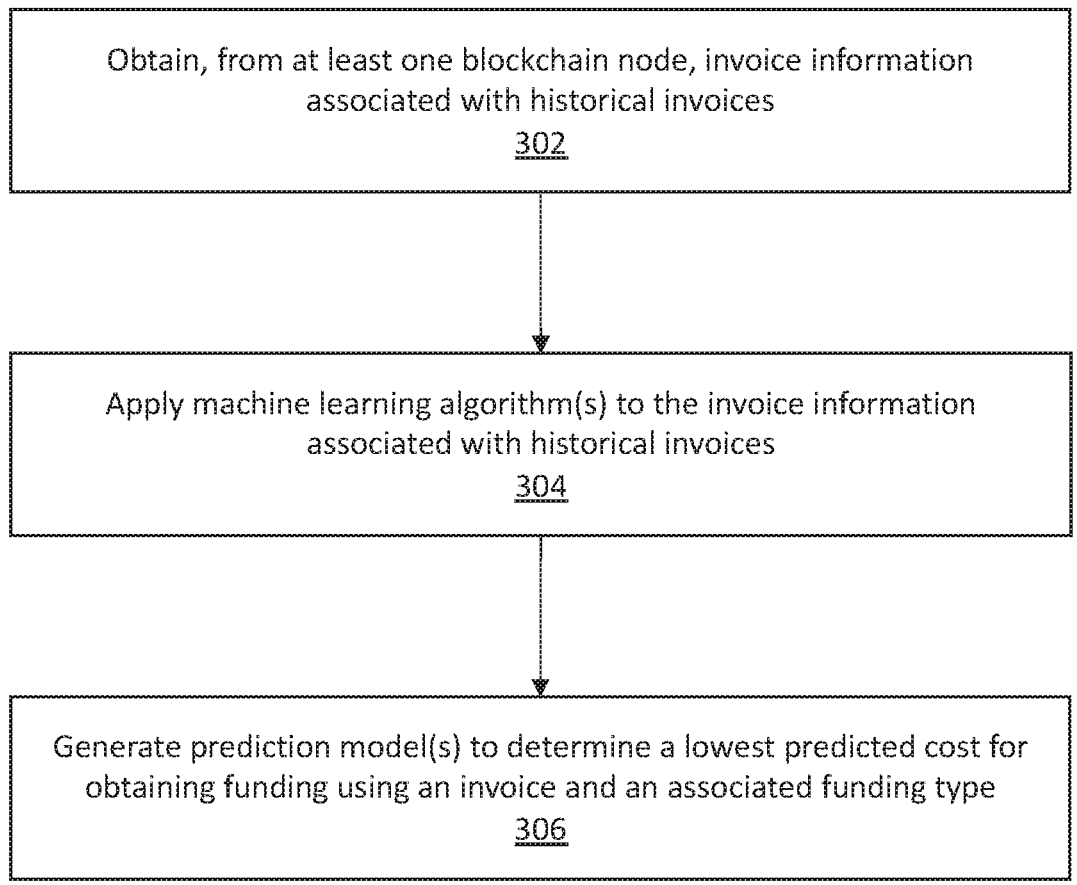
FIG. 3 illustrates an example set of operations for generating, based on blockchain data, one or more prediction models to determine a predicted cost incurred through a funding type of obtaining funding using an invoice, in accordance with one or more embodiments.

FIG. 3 illustrates an example set of operations for generating, based on blockchain data, one or more prediction models to determine a predicted cost incurred through a funding type of obtaining funding using an invoice, in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

One or more embodiments include obtaining, from at least one blockchain node, invoice information associated with historical invoices (Operation 302). A machine learning system obtains blockchain data from one or more blockchain nodes. The blockchain data includes invoice information associated with historical invoices. Optionally, the machine learning system may validate the blockchain data. The machine learning system may verify whether the hash of each block matches the data of each block. The machine learning system may verify whether each block stores the correct hash for the preceding block. The machine learning system may verify whether blockchain data obtained from different blockchain nodes are the same. If any of the verifications fail, then the machine learning system may attempt to obtain blockchain data from another blockchain node. If the verifications succeed, then the machine learning system proceeds with applying one or more machine learning algorithms.

Historical invoices may include any invoice that has been issued, including invoices that have been paid off, invoices that were sold to third parties, and invoices that are outstanding. Invoice information may include information directly ascertainable from an invoice itself, information that is obtained from a seller and/or buyer, and/or information obtained from third parties that are associated with a sale.

One or more embodiments include applying one or more machine learning algorithms to the invoice information associated with historical invoices (Operation 304). The machine learning system applies one or more machine learning algorithms (such as machine learning algorithms 240 of FIG. 2) to the invoice information associated with historical invoices.

In an embodiment, the machine learning system applies a different machine learning algorithm for each funding type. From each machine learning algorithm, the machine learning system obtains a separate prediction model for each funding type. The type of machine learning algorithm applied for each funding type may be same or different.

As an example, a machine learning system may apply a linear regression algorithm to invoice information associated with historical invoices to obtain a prediction model to predict whether an invoice would be paid by a due date (or by a certain time window within a due date). The linear regression algorithm may include applying certain weights to certain inputs, and obtaining a weighted sum. The machine learning system may apply a linear regression algorithm to invoice information associated with historical invoices to obtain a prediction model to predict a percentage discount at which an invoice is paid off before a due date. Even though the type of machine learning algorithm (linear regression) is the same for the two prediction models, the weights, sums, and/or other attributes of the machine learning algorithm may be different for the two prediction models. The machine learning system may apply a classification tree algorithm to invoice information associated with historical invoices to obtain a prediction model to predict a percentage loss at which an invoice is sold to a third party. The machine learning system may use machine learning algorithms of different types for different funding types.

In an embodiment, the machine learning system applies the different machine learning algorithms, for the respective funding types, to the same set of invoice information associated with historical invoices. In an alternative embodiment, the machine learning system applies the different machine learning algorithms, for the respective funding types, to the different sets of invoice information associated with historical invoices.

As an example, in order to generate a prediction model to predict whether an invoice would be paid by a due date, historical invoices that were timely paid may be identified. A first set of invoice information associated with historical invoices that were timely paid may be identified. A machine learning algorithm may be applied to the first set of invoice information to generate the prediction model to predict whether an invoice would be paid by a due date. In order to generate a prediction model to predict a percentage discount at which an invoice is paid off before a due date, historical invoices that received early payment may be identified. A second set of invoice information associated with historical invoices that received early payment may be identified. A machine learning algorithm may be applied to the second set of invoice information to generate the prediction model to predict a percentage discount at which an invoice is paid off before a due date. In order to generate a prediction model to predict a percentage loss at which an invoice is sold to a third party, historical invoices that were sold to third parties may be identified. A third set of invoice information associated with historical invoices that were sold to third parties may be identified. A machine learning algorithm may be applied to the third set of invoice information to generate the prediction model to predict a percentage loss at which an invoice is sold to a third party.

In an embodiment, the machine learning system applies a single machine learning algorithm to generate a prediction model for predicting a lowest cost for obtaining funding using an invoice and the funding type associated with the lowest cost. As an example, a machine learning system may determine correlations between (a) attributes of invoice information and (b) different funding types. The machine learning system may determine, for example, that invoices for a certain buyer are correlated with on time payment. The machine learning system may determine, for example, that invoices for a certain type of goods are correlated with receiving early payment at an average of 4% discount, and invoices for a different type of goods are correlated with receiving early payment at an average of 5% discount. The machine learning system may determine, for example, that invoices for which a shipping company has confirmed delivery of goods are correlated with being sold to a third party at an average of 8% loss.

One or more embodiments include generating one or more prediction models to determine a lowest predicted cost for obtaining funding using an invoice and an associated funding type (Operation 306). The machine learning system generates a prediction model by applying a machine learning algorithm to invoice information associated with historical invoices. In an embodiment, the machine learning system may generate a separate prediction model for each funding type. Each prediction model determines a predicted cost for a respective funding type. The separate prediction models may be subsidiary prediction models that are combined into a single prediction model for predicting a lowest cost for obtaining funding using an invoice and the funding type associated with the lowest cost. In an alternative embodiment, the machine learning system may generate one prediction model for predicting a lowest cost for obtaining funding using an invoice and the funding type associated with the lowest cost.

4. Applying a Prediction Model Based on Blockchain Data

Figure 4:
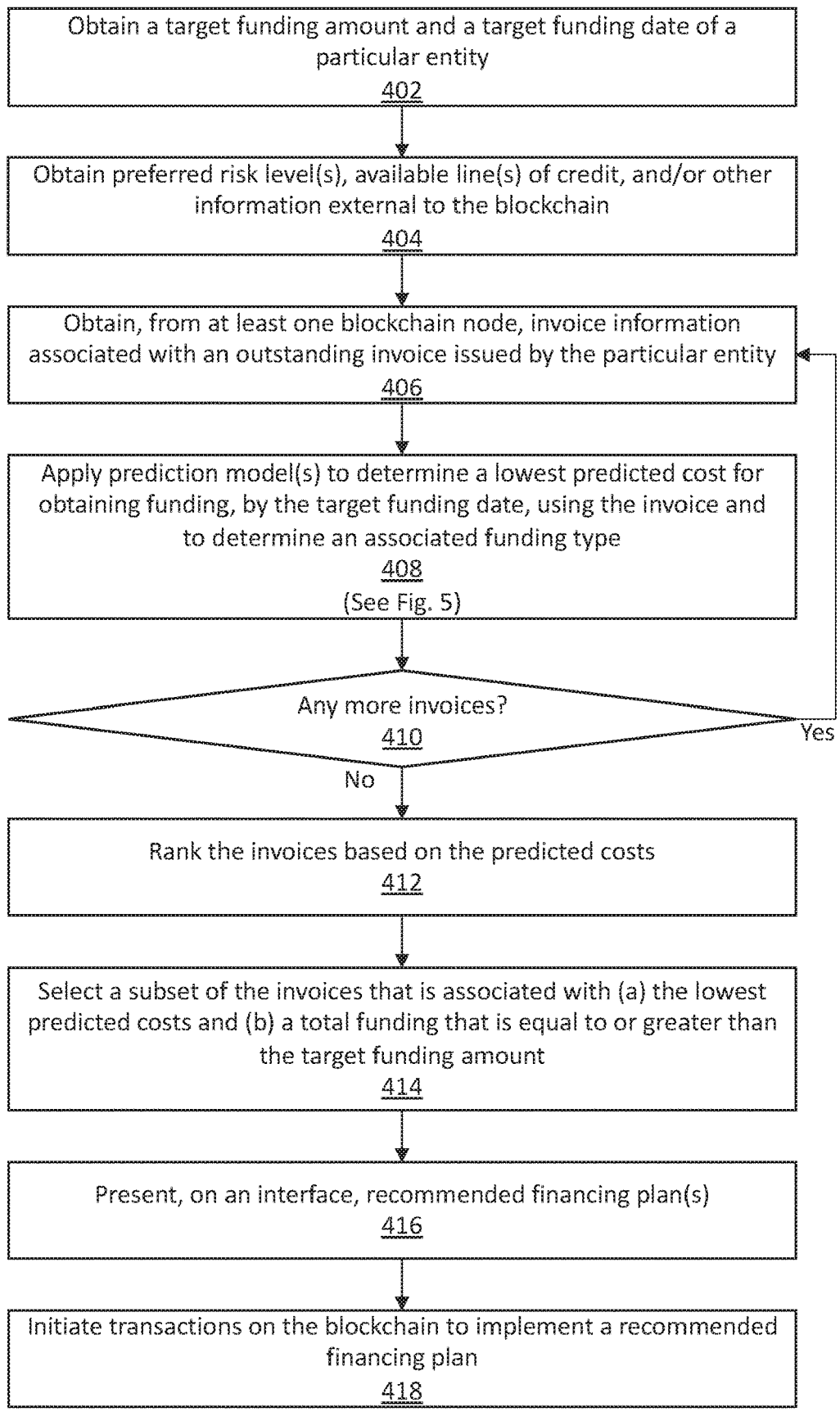
FIG. 4 illustrates an example set of operations for generating a recommendation for obtaining a target funding amount by a target funding date, in accordance with one or more embodiments.

FIG. 4 illustrates an example set of operations for generating a recommendation for obtaining a target funding amount by a target funding date, in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

One or more embodiments include obtaining a target funding amount and a target funding date of a particular entity (Operation 402). A recommendation generator (such as recommendation generator 246 of FIG. 2) obtains a target funding amount and a target funding date of a particular entity. The recommendation generator may obtain the information from a user interface and/or an application.

As an example, an employee of Truck Company may determine that $24,000 is needed on Feb. 13, 2019, to pay contractors who are remodeling an office for Truck Company. The employee may enter the amount and date into a user interface. A recommendation generator may receive the amount and date from the user interface.

As another example, a payroll system of PharmaCare Co. may determine that $35,000 is needed on Mar. 1, 2019, as salary for the employees of PharmaCare Co. The payroll system may transmit a message to a recommendation generator indicating that $35,000 is needed by Mar. 1, 2019.

One or more embodiments include obtaining preferred risk level(s), available line(s) of credit, and/or other information external to the blockchain (Operation 404). The recommendation generator obtains information external to the blockchain. The recommendation generator may obtain the information from a user interface and/or an application.

In an embodiment, the recommendation generator obtains a preferred risk level of the particular entity. A risk level indicates an amount of risk associated with a recommended financing plan generated by the recommendation generator. Risk level may be inversely proportional to cost. Hence, a recommended financing plan with a greater risk may be associated with a lower cost, while another recommended financing plan with a lower risk may be associated with a greater cost. In an embodiment, the recommendation generator obtains multiple preferred risk levels of the particular entity. The recommendation generator may generate a recommended financing plan at each preferred risk level.

In an embodiment, the recommendation generator obtains available lines of credit of the particular entity. As an example, a particular entity may have a relationship with Community Bank. A website of Community Bank may indicate that an interest of 9% is charged for loans available to the particular entity. A recommendation generator obtains information indicating that a line of credit associated with the 9% interest rate is available to the particular entity.

In an embodiment, the recommendation generator obtains other preferences of the particular entity. As an example, a particular entity may prefer to use a maximum of 300 invoices for achieving the target funding amount. Another entity may prefer to use a minimum of 100 invoices for achieving the target funding amount. Another entity may prefer not to sell any invoices to a particular third party. Another entity may prefer not to request early payment from a particular buyer. Another entity may prefer not to use a particular bank for obtaining a line of credit.

One or more embodiments include obtaining, from at least one blockchain node, invoice information associated with an outstanding invoice issued by the particular entity (Operation 406). The recommendation generator obtains blockchain data from one or more blockchain nodes. The blockchain data includes invoice information associated with an outstanding invoice issued by the particular entity. An outstanding invoice is an invoice for which full payment has not yet been received. Examples of operations for obtaining blockchain data from one or more blockchain nodes are described above with reference to Operation 302 of FIG. 3.

One or more embodiments include applying one or more prediction models to determine a lowest predicted cost for obtaining funding, by the target funding date, using the invoice and to determine an associated funding type (Operation 408).

Figure 5:
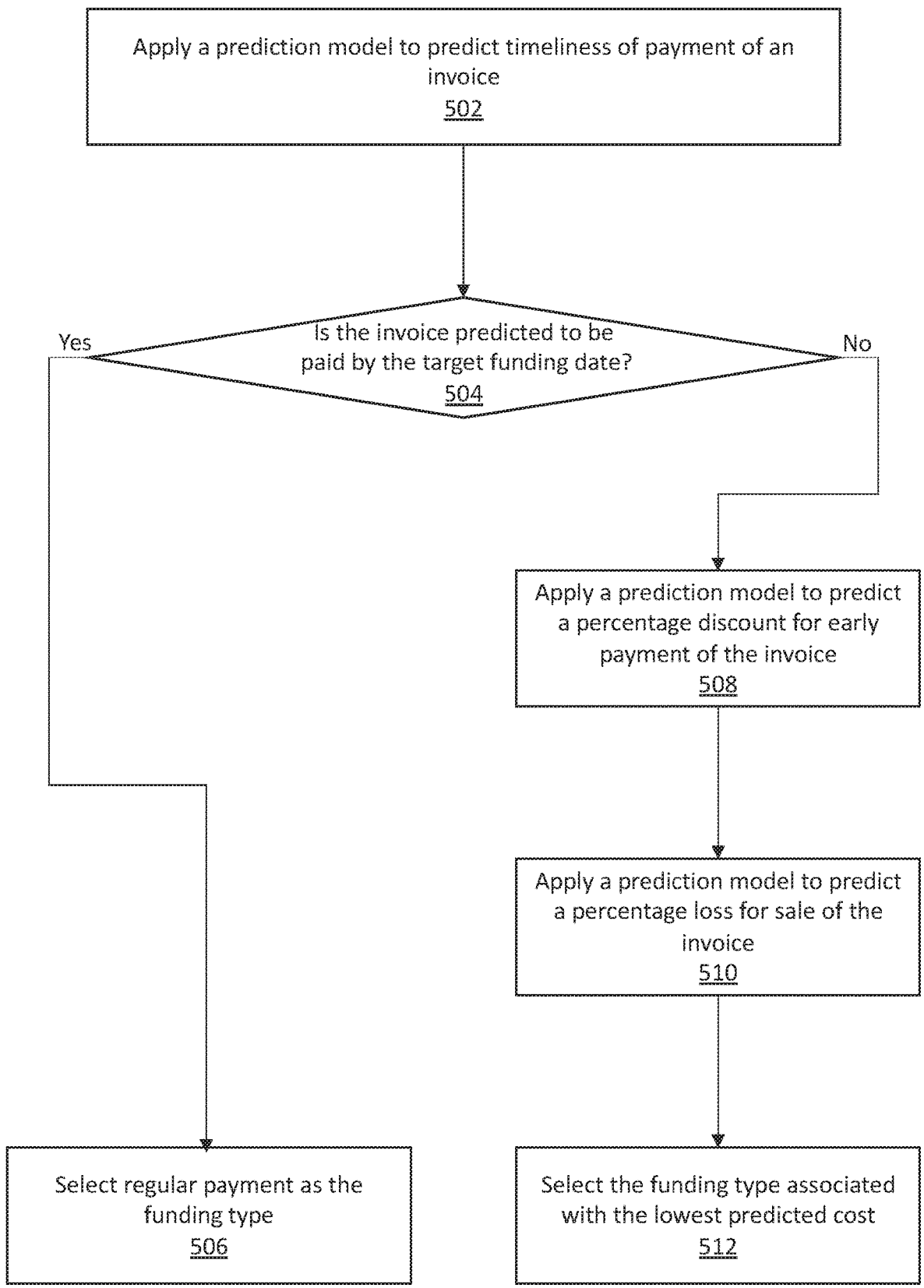
FIG. 5 illustrates an example set of operations for applying, based on blockchain data, one or more prediction models to determine a predicted cost incurred through a funding type of obtaining funding using an invoice, in accordance with one or more embodiments.

In an embodiment, the recommendation generator applies prediction models to determine predicted costs to be incurred through each funding type associated with obtaining funding using the invoice. The recommendation generator applies a prediction model to determine whether the invoice will be paid by the target funding date (which would result in zero cost). The recommendation generator applies another prediction model to determine a predicted cost to be incurred through requesting early payment. The recommendation generator applies another prediction model to determine a predicted cost to be incurred through invoice factoring. The recommendation generator determines which funding type is associated with the lowest predicted cost. Invoice information associated with the invoice is input into each of the prediction models. FIG. 5 provides an example set of operations for determining predicted costs to be incurred through each funding type. Additional and/or alternative operations for determining predicted costs to be incurred through each funding type may be used.

In an embodiment, the recommendation generator applies a prediction model to determine a lowest predicted cost for obtaining funding, by the target funding date, using the invoice. Invoice information associated with the invoice is input into the prediction model. The prediction model outputs a lowest predicted cost for obtaining funding, by the target funding date, using the invoice. The lowest predicted cost is a lowest predicted cost associated with using a particular funding type on the invoice, relative to the predicted costs associated with using other funding types on the invoice. The prediction model also outputs the particular funding type associated with obtaining funding using the invoice that results in the lowest predicted cost.

In an embodiment, the recommendation generator determines certain attributes of the invoice information associated with the invoice. The recommendation generator inputs the attributes into a prediction model. The prediction model determines that the attributes are correlated with a particular average cost. In particular, funding was obtained using each of a set of historical invoices associated with similar attributes, while incurring the particular average loss. Based on the similarity in the attributes between the current invoice and the historical invoices, the prediction model determines that the predicted cost for the current invoice is the same as the average loss incurred in obtaining funding using the historical invoices.

In an embodiment, the recommendation generator received a preferred risk level at Operation 404. The recommendation generator obtains a result from a prediction model that is at the preferred risk level. As an example, a prediction model may determine that a likelihood of obtaining early payment at 5% loss is 95%. The prediction model may determine that a likelihood of obtaining early payment at 6% loss is 97%. A particular entity's preferred risk level may be 3%. Since the 6% loss is associated with a 3% risk, the recommendation generator may determine that the predicted cost for early payment is 6%, rather than 5%.

In an embodiment, the recommendation generator received other preferences of the particular entity at Operation 404. The recommendation generator may take into account the particular entity's preferences when determining a lowest predicted cost. As an example, a particular entity may prefer not to sell invoices associated with a particular buyer. A prediction model may be applied to a particular invoice that is associated with the particular buyer. The prediction model may determine that the funding type that will result in a lowest cost (for example, 3%) is selling the particular invoice. However, since selling the particular invoice is not preferred, the prediction model may be re-applied to the particular invoice. The prediction model may determine that the funding type that will result in a second lowest cost (for example, 5%) is requesting early payment. Therefore, the second lowest cost (5%) may be determined as the predicted cost for the particular invoice. Early payment may be determined as the funding type to be used for the particular invoice.

One or more embodiments include determining whether there are any additional outstanding invoices issued by the particular entity (Operation 410). The recommendation generator determines whether there are any additional outstanding invoices issued by the particular entity that have not yet been analyzed. If there is an additional invoice, then the recommendation generator iterates Operations 406-408 to analyze the additional invoice.

One or more embodiments include ranking the invoices based on the predicted costs (Operation 412). The recommendation generator ranks the invoices based on the predicted costs determined at Operation 408.

As an example, a recommendation generator may determine that requesting early payment on a first invoice would result in a 5% loss. The recommendation generator may determine that selling the first invoice would result in a 9% loss. Therefore the lowest predicted cost (relative to different funding types) for the first invoice is 5%. The associated funding type is early payment. The recommendation generator may determine that requesting early payment on a second invoice would result in a 7% loss. The recommendation generator may determine that selling the second invoice would result in a 6% loss. Therefore the lowest predicted cost (relative to different funding types) for the second invoice is 6%. The associated funding type is invoice factoring.

Continuing the example, the invoices are ranked based on the lowest predicted cost. Hence, the first invoice is ranked based on the predicted cost of 5%. The second invoice is ranked based on the predicted cost of 6%. Since the predicted cost of the first invoice is lower than the predicted cost of the second invoice, the first invoice may be ranked prior to the second invoice.

In an embodiment, the recommendation generator received line of credit information at Operation 404. If a predicted cost of obtaining funding using an invoice is higher than an interest rate charged by a line of credit, then it is less expensive for the particular entity to obtain the line of credit. Therefore the recommendation generator excludes any invoice that is associated with a predicted cost that is above a lowest interest rate charged by a line of credit.

One or more embodiments include selecting a subset of the invoices that is associated with (a) the lowest predicted costs and (b) a total funding that is equal to or greater than the target funding amount (Operation 414). The recommendation generator starts from the first invoice in the ranked set of invoices (the invoice with the lowest predicted cost, relative to other outstanding invoices of the particular entity). The recommendation generator iterates through the invoices in the ranked set of invoices, until the sum of funding obtained from the iterated invoices is equal to or greater than the target funding amount. The iterated invoices constitute the selected subset of invoices.

In an embodiment, the recommendation generator received other preferences of the particular entity at Operation 404. The recommendation generator may take into account the particular entity's preferences when selecting the subset of invoices.

As an example, a particular entity may prefer not to sell invoices associated with a particular buyer. A prediction model may determine that the funding type that will result in a lowest cost for obtaining funding using a particular invoice is selling the particular invoice. The particular invoice may be associated with the particular buyer. A recommendation generator may refrain from selecting the particular invoice.

As another example, a particular entity may prefer to use a maximum of 450 invoices in obtaining a target funding amount of $70,000. A prediction model may determine that a sum of $40,000 is obtainable using 200 invoices at a 5% loss; and a sum of $50,000 is obtainable using 500 invoices at a 7% loss.

Continuing the above example, a recommendation generator may first select the invoices with the lowest cost, that is, the 200 invoices associated with 5% loss. The sum raised by the 200 invoices is $40,000, which is still $30,000 away from the target funding amount. Since the preferred maximum number of invoices is 450, the recommendation generator needs to select at most 250 more invoices. However, there are 500 invoices associated with the same loss of 7%.

Within the 500 invoices, there may be 350 invoices, associated with Buyer A and an amount due of $125 each; and 150 invoices, associated with Buyer B and an amount due of $52 each. The recommendation generator may select the 150 Buyer B invoices and 178 of the 350 Buyer A invoices, to reach the remainder amount of $30,000. However, then the total number of selected invoices would be 200+150+178=528, which exceeds the preferred maximum number of invoices.

Therefore, the recommendation generator may select 240 of the 350 Buyer A invoices, to reach the remainder amount of $30,000. Meanwhile, the total number of selected invoices is 200+240=440, which is within the preferred maximum number of invoices.

One or more embodiments include presenting, on an interface, one or more recommended financing plans (Operation 416). The recommendation generator generates a recommended financing plan based on the selected invoices. The recommended financing plan indicates that each of the selected invoices should be used for obtaining the target funding amount by the target funding date. The recommended financing plan further indicates each funding type that should be used for each of the selected invoices in obtaining the target funding amount by the target funding date.

In an embodiment, the recommendation generator received multiple preferences at Operation 404. The recommendation generator may generate a recommended financing plan that matches one or more preferences. Additionally or alternatively, the recommendation generator may generate a different recommended financing plan for prioritizing different preferences. As an example, a particular entity may indicate obtaining funding based on invoices associated with Buyer A, and a preference for using a least quantity of invoices to achieve the target funding amount. A recommendation generator may generate a first recommended financing plan for using 100 invoices, 80 of which are associated with Buyer A. The recommendation generator may generate a second recommended financing plan for using 200 invoices, 50 of which are associated with Buyer A. Hence, in this example, the first recommended financing plan prioritizes the preference of using a least quantity of invoices over the preference of using Buyer A invoices. The second recommended financing plan prioritizes the preference of using Buyer A invoices over the preference of using a least quantity of invoices.

The recommendation generator causes a recommended financing plan to be presented on an interface. In an embodiment, the interface presents a listing of all selected invoices. The interface presents information associated with each selected invoice, such as the funding type to be used, the amount of funding to be obtained, and/or the loss to be incurred. In an embodiment, the interface presents a summary which includes a breakdown by funding type. For each funding type, the interface presents the total amount of funding to be obtained and the average loss to be incurred. An example of an interface presenting recommended financing plans is described below with reference to FIG. 7.

One or more embodiments include initiating transactions on the blockchain to implement a recommended financing plan (Operation 418). The recommendation generator initiates a transaction on the blockchain to implement a recommended financing plan.

The recommendation generator identifies a particular invoice. The recommendation generator determines a predicted cost associated with obtaining funding using the particular invoice, as determined by a prediction model. The recommendation generator determines a funding type associated with the predicted cost and the particular invoice. If the funding type is "Early Payment," then the recommendation generator transmits, to the buyer associated with the particular invoice, an offer for a percentage discount on the amount due in exchange for early payment. The percentage discount is determined based on the predicted cost. If the funding type is "Invoice Factoring," then the recommendation generator transmits an offer for sale of the invoice at a discounted price to one or more third parties. Alternatively, the recommendation generator transmits the offer for sale of the invoice to a marketplace that is accessible by one or more third parties. The discounted price is determined based on the predicted cost.

The recommendation generator transmits the offer using the blockchain. The recommendation generator proposes a transaction on the blockchain. The transaction is, for example, the offer for early payment, or the offer for sale of the invoice. Endorsing nodes of the blockchain endorse the proposed transaction. The endorsed transaction is transmitted to an ordering service. The ordering service includes the endorsed transaction in a block. The block is transmitted to all blockchain nodes. Each blockchain node stores the block. The transaction is therefore committed. Based on the commitment of the transaction, the offer is therefore transmitted to a buyer and/or a third party and/or a marketplace.

FIG. 5 illustrates an example set of operations for applying, based on blockchain data, one or more prediction models to determine a predicted cost incurred through a funding type of obtaining funding using an invoice, in accordance with one or more embodiments. One or more operations illustrated in FIG. 5 may be modified, rearranged, or omitted all together. Accordingly, the particular sequence of operations illustrated in FIG. 5 should not be construed as limiting the scope of one or more embodiments.

FIG. 5 shows the use of a master prediction model that includes multiple subsidiary prediction models. The subsidiary prediction models include (a) a prediction model to predict timeliness of payment of an invoice (applied at Operation 502), (b) a prediction model to predict a percentage discount for early payment of the invoice (applied at Operation 508), and (c) a prediction model to predict a percentage loss for sale of the invoice (applied at Operation 510). Additional and/or alternative subsidiary prediction models may be used. The inputs to each of the prediction models at Operations 502, 508, and 510, respectively, may be but is not necessarily the same. As an example, a first subset of invoice information associated with a particular invoice may be input into a prediction model to predict timeliness of payment. A second subset of invoice information associated with the particular invoice may be input into a prediction model to predict a percentage discount for early payment. A third subset of invoice information associated with the particular invoice may be input into a prediction model to predict a percentage loss for sale of the invoice.

One or more embodiments include applying a prediction model to predict timeliness of payment of an invoice (Operation 502). Invoice information associated with an invoice is input into a prediction model to predict timeliness of payment. A target funding date is also input to the prediction model. The prediction model outputs a likelihood that the invoice will be paid by the target funding date.

In an embodiment, a prediction model is configured to predict whether an invoice will be paid by the due date. The prediction model is applied to outstanding invoices that have a due date on or before the target funding date. If the prediction model predicts that the invoice will be paid by the due date, then the invoice is predicted to be paid by the target funding date.

In an embodiment, a prediction model is configured to predict whether an invoice will be paid within a certain time window prior to the due date. The prediction model is applied to outstanding invoices that have a due date after the target funding date. The prediction model predicts whether an invoice will be paid by the target funding date, even though the due date is after the target funding date. As an example, a target funding date may be February 2. A due date of an invoice, associated with Buyer A, may be February 28, after the target funding date. Buyer A may have a pattern of paying off all invoices that are due within a particular month on the first of the particular month. Based on the pattern, a prediction model may predict that the invoice may be paid in full on February 1. Therefore, the invoice is predicted to be paid by the target funding date of February 2.

One or more embodiments include determining whether the invoice is predicted to be paid by the target funding date (Operation 504). The likelihood that the invoice will be paid by the target funding date is compared with a threshold value. If the likelihood that the invoice will be paid by the target funding date is greater than the threshold value, then the invoice is predicted to be paid by the target funding date. Therefore, "Regular Payment" is selected as the funding type (Operation 506). The invoice is not recommended for early payment or for sale. Optionally, a particular entity that issued the invoice may transmit a reminder to the buyer to pay the invoice on time.

If the invoice is not predicted to be paid by the target funding date, then one or more embodiments include applying a prediction model to predict a percentage discount for early payment of the invoice (Operation 580). Invoice information associated with the invoice is input into a prediction model to predict percentage discount for early payment. A target funding date is also input to the prediction model. The prediction model outputs a predicted percentage discount at which the buyer associated with the invoice would agree to pay the invoice by the target funding date. The prediction model predicts that the buyer would agree to pay the invoice by the target funding date, which is before the due date of the invoice, if the buyer is offered the predicted percentage discount.

One or more embodiments include applying a prediction model to predict a percentage loss for sale of the invoice (Operation 510). Invoice information associated with the invoice is input into a prediction model to predict percentage loss for sale of the invoice. A target funding date is also input to the prediction model. The prediction model outputs a predicted percentage loss at which a third party would agree to purchase the invoice by the target funding date. The prediction model predicts that the third party would agree to purchase the invoice by the target funding date, which is before the due date of the invoice, if the invoice is sold with the predicted percentage loss.

One or more embodiments include selecting the funding type associated with the lowest predicted cost (Operation 512). The percentage discount predicted at Operation 508 is the predicted cost, to the particular entity issuing the invoice, for obtaining early payment. The percentage loss predicted at Operation 510 is the predicted cost, to the particular entity issuing the invoice, for selling the invoice. The percentage discount predicted at Operation 508 and the percentage loss predicted at Operation 510 are compared. The lower percentage is identified. The funding type associated with the lower percentage is selected. Hence, a funding type resulting in a lowest predicted cost for obtaining funding using the invoice is determined.

As an example, a prediction model may predict that early payment may be obtained on an invoice at a percentage discount of 2%. Another prediction model may predict that the invoice may be sold at a percentage loss of 5%. Since the predicted cost for obtaining early payment (2%) is lower than the predicted cost for selling the invoice (5%), early payment is selected as the funding type to be used for the invoice.

5. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

FIG. 6 shows a table that illustrates example predicted costs for various funding types, in accordance with one or more embodiments.

In one or more embodiments, Produce Inc. needs to pay contractors an amount of $200,000 by Mar. 1, 2019, for a construction project. Hence, a target funding amount 602 is $200,000. Produce Inc. has access to a line of credit with an interest rate of 10%.

A recommendation generator identifies outstanding invoices of Produce Inc. The recommendation generator obtains blockchain data from a blockchain node. The blockchain data includes invoice information associated with a particular outstanding invoice. The invoice information includes a buyer associated with the invoice, credit information associated with the buyer, and shipment tracking information associated with the goods sold. The buyer associated with the invoice is ascertained from information within the invoice. The credit information associated with the buyer is determined based on past transactions of the buyer that were conducted on the blockchain. The past transactions indicate whether the buyer has a tendency to make timely payments. The shipment tracking information is determined based on transactions, on the blockchain, initiated by a shipping company used by Produce Inc. The shipping company requests the transactions on the blockchain at different stages of the delivery process, for example, at the time a package leaves an originating location, at the time a package arrives at an intermediate location, at the time a package arrives at a destination, and/or at the time a package is signed as received by a recipient.

The recommendation generator applies a prediction model to the invoice information. The prediction model was previously generated by applying a machine learning algorithm to invoice information of historical invoices, as obtained from the blockchain.

Based on the prediction model, the recommendation generator determines that the predicted lowest cost for obtaining funding, by Mar. 1, 2019, using the invoice is 6%. The funding type for obtaining the predicted lowest cost is "Early Payment."

The recommendation generator iterates the operation of applying the prediction model to each outstanding invoice of Produce Inc. The recommendation generator determines a predicted lowest cost and associated funding type for each outstanding invoice.

The recommendation generator ranks the outstanding invoices by predicted cost. The recommendation generator excludes invoices associated with a predicted cost that is greater than 10% (which is the interest rate of the line of credit).

For each funding type, the recommendation generator determines an amount of funding that is obtainable from outstanding invoices associated with a predicted cost that is lower than 10%.

For example, as illustrated in table 600, for "Regular Payment," the recommendation generator determines that a total of $55,000 is obtainable from a first set of outstanding invoices before Mar. 1, 2019. A total of the original amounts due on the first set of outstanding invoices is $55,000. The predicted cost is zero.

For "Early Payment," the recommendation generator determines that a total of $56,400 is obtainable from a second set of outstanding invoices before Mar. 1, 2019. A total of the original amounts due on the second set of outstanding invoices is $60,000. The predicted cost is $3,600, or an average of 6%.

For "Sale," the recommendation generator determines that a total of $73,600 is obtainable from a third set of outstanding invoices before Mar. 1, 2019. A total of the original amounts due on the third set of outstanding invoices is $80,000. The predicted cost is $6,400, or an average of 8%.

The sum of the predicted amounts obtained from the above funding types is $55,000+$56,400+73,600=$185,000. Therefore, Produce Inc. is still $15,000 short of obtaining the target funding amount of $200,000. There may be other outstanding invoices issued by Produce Inc. However, the other outstanding invoices are associated with a predicted cost greater than 10%. Therefore, the other outstanding invoices are not used for obtaining the target funding amount.

The recommendation generator determines that Produce Inc. may access the line of credit to obtain the $15,000. The predicted cost for using the line of credit is 10% of $15,000, which is $1,500.

The recommendation generator sums up the predicted costs of each funding type. The recommendation generator determines that the total predicted cost for obtaining $200,000 by Mar. 1, 2019, is $11,500.

Therefore, the recommendation generator generates a recommended financing plan that includes obtaining $55,000 through "Regular Payment," $56,400 through "Early Payment," $73,600 through "Sale," and $15,000 through the line of credit.

Figure 7:
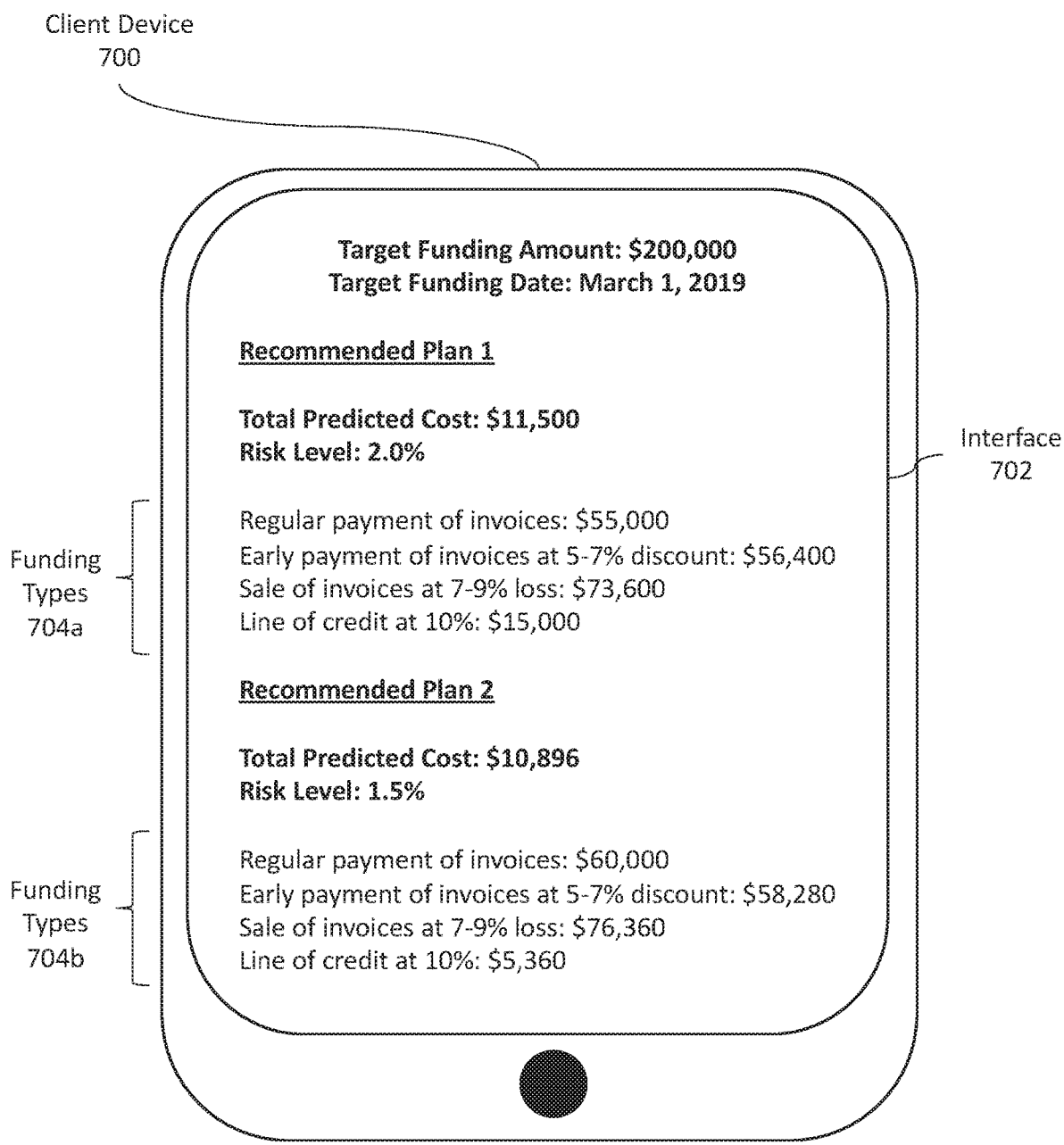
FIG. 7 illustrates an example user interface presenting a recommendation for obtaining a target funding amount by a target funding date, in accordance with one or more embodiments.

FIG. 7 illustrates an example user interface presenting a recommendation for obtaining a target funding amount by a target funding date, in accordance with one or more embodiments.

Produce Inc. desires to obtain a target funding amount of $200,000, by a target funding date of Mar. 1, 2019. A recommendation generator generates "Recommended Plan 1" based on table 600 of FIG. 6. The recommendation generator also generates another recommended financing plan, "Recommended Plan 2." Recommended Plan 1 is associated with a risk level of 2.0%. Recommended Plan 2 is associated with a risk level of 1.5%. Recommended Plan 1 is associated with a total predicted cost of $11,500. Recommended Plan 2 is associated with a total predicted cost of $10,896. While Recommended Plan 1 may be considered more aggressive than Recommended Plan, Recommended Plan 1 is a less expensive financing option than Recommended Plan 2.

The recommendation generator causes presentation of the recommended financing plans on an interface 702 of a client device 700. The interface 702 presents a summary of each recommendation. Each summary includes a breakdown by funding types.

Recommended Plan 1 is associated with funding types 704a. Under "Regular payment of invoices," a total of $55,000 is obtainable. Under "Early payment of invoices," a total of $56,400 is obtainable. A 5-7% discount is predicted for the $56,400 to be obtained using early payment. Under "Sale of invoices," a total of $73,600 is obtainable. A 7-9% loss is predicted for the $73,600 to be obtained using invoice factoring. Under "line of credit," $15,000 is to be obtained, at a 10% interest rate.

Recommended Plan 2 is associated with funding types 704b. Under "Regular payment of invoices," a total of $60,000 is obtainable. Under "Early payment of invoices," a total of $58,280 is obtainable. A 5-7% discount is predicted for the $58,280 to be obtained using early payment. Under "Sale of invoices," a total of $76,360 is obtainable. A 7-9% loss is predicted for the $76,360 to be obtained using invoice factoring. Under "line of credit," $5,360 is to be obtained, at a 10% interest rate.

Produce Inc. selects Recommended Plan 2. An administrator of Produce Inc. enters user input via interface 702, indicating selection of Recommended Plan 2. Responsive to the selection of Recommended Plan 2, the recommendation generator identifies invoices to be offered for early payment based on Recommended Plan 2. The recommendation generator identifies the percentage discount predicted for each invoice based on Recommended Plan 2. The recommendation generator transmits, via the blockchain, offers for early payment at the identified percentage discounts for the respective identified invoices.

Further, the recommendation generator identifies invoices to be offered for sale based on Recommended Plan 2. The recommendation generator identifies the percentage loss predicted for each invoice based on Recommended Plan 2. The recommendation generator transmits, via the blockchain, offers for sale of the identified invoices at the respective identified percentage losses.

If the bank offering the line of credit is an entity associated with the blockchain, the recommendation generator may also transmit, via the blockchain, a request for $5,360 on the line of credit. The bank may receive the request for the line of credit via the blockchain. The bank may provide $5,360 to Produce Inc. using the blockchain.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
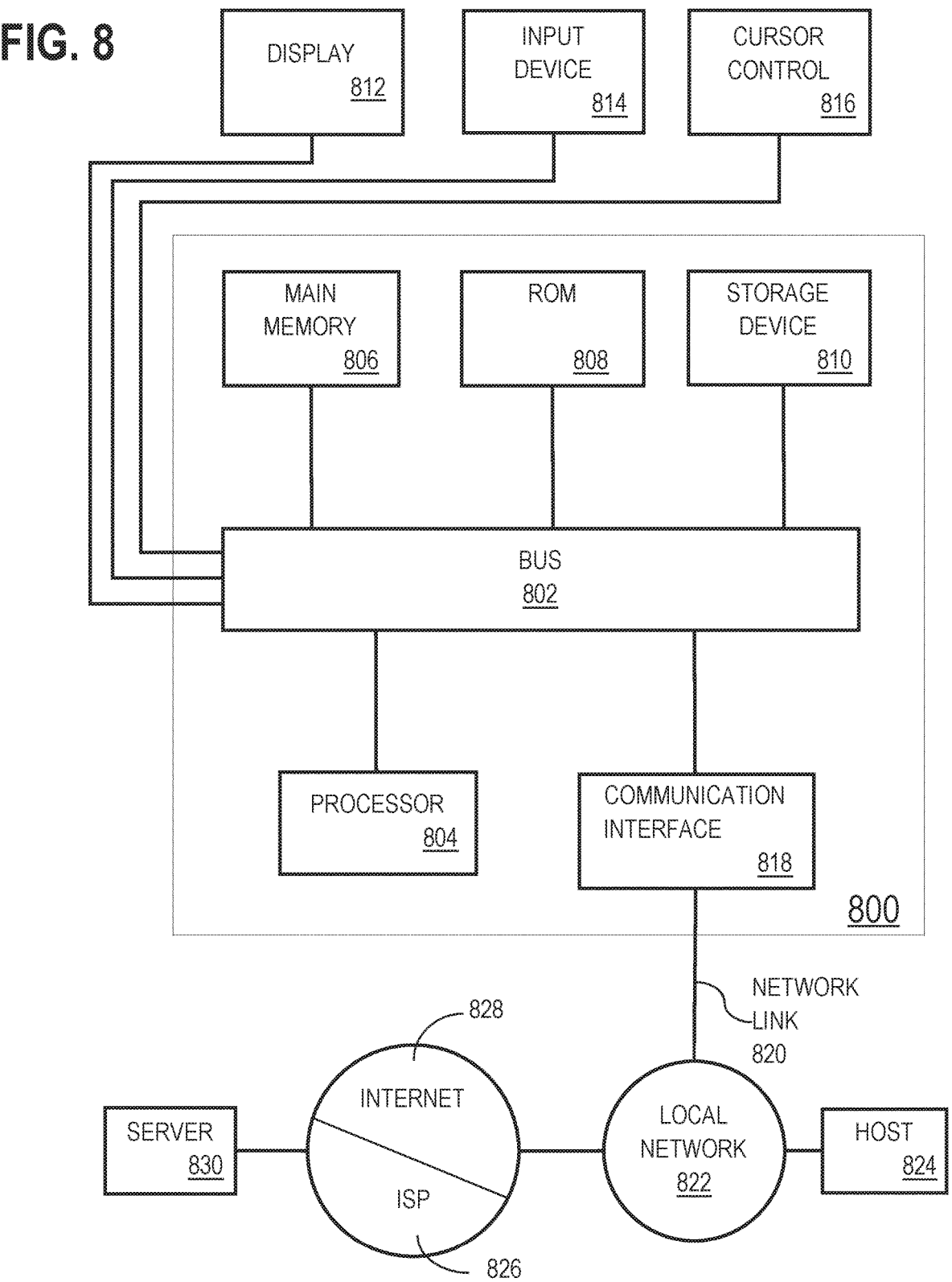
FIG. 8 shows a block diagram that illustrates a computer system in accordance with one or more embodiments.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
   obtaining, from at least a first node of a plurality of nodes, a first set of information associated with a first plurality of invoices;
   wherein each of the plurality of nodes maintains a respective copy of a same blockchain ledger;
   wherein the blockchain ledger comprises a plurality of blocks, each block comprising one or more transactions, and each block associated with a preceding block based on a hash of the preceding block;
   wherein the blockchain ledger comprises at least one transaction associated with each of the first plurality of invoices;
   iteratively training a machine learning algorithm using the first set of information associated with the first plurality of invoices as training data, wherein the machine learning algorithm generates a prediction model;
   determining, using the prediction model, a predicted lowest cost of obtaining funding using an invoice and an associated funding type;
   obtaining a target funding amount and a target funding date of a particular entity;
   generating a recommendation for obtaining the target funding amount, by the target funding date, using a subset of a second plurality of invoices issued by the particular entity, wherein the generating the recommendation comprises:
   obtaining, from at least a second node of the plurality of nodes, a second set of information associated with a first invoice of the second plurality of invoices;

obtaining, from at least a third node of the plurality of nodes, a third set of information associated with a second invoice of the second plurality of invoices;

determining, by applying the prediction model to the second set of information (a) a first predicted lowest cost of obtaining funding, by the target funding date, using the first invoice and (b) a first associated funding type;

determining, by applying the prediction model to the third set of information (a) a second predicted lowest cost of obtaining funding, by the target funding date, using the second invoice and (b) a second associated funding type;

wherein the first associated funding type and the second associated funding type are different;

based on a comparison of the first predicted lowest cost and the second predicted lowest cost, selecting the first invoice for obtaining the target funding amount of the particular entity, without selecting the second invoice for obtaining the target funding amount of the particular entity; and presenting, at an interface, the recommendation for obtaining the target funding amount by the target funding date using the first invoice, without using the second invoice.

2. The one or more media of claim 1, wherein the first node, the second node, and the third node are the same.

3. The one or more media of claim 1, further storing instructions which, when executed by one or more processors, cause:

verifying that the blockchain ledger including the first set of information is valid.

4. The one or more media of claim 3, wherein verifying that the blockchain ledger is valid comprises:

verifying that data of a particular block matches a first hash of the particular block as stored by the particular block; and verifying that the first hash of the particular block as stored by the particular block matches a second hash of the particular block as stored by another block following the particular block.

5. The one or more media of claim 3, wherein verifying that the blockchain ledger is valid comprises:

obtaining a first copy of the blockchain ledger from the first node;

obtaining a second copy of the blockchain ledger from a fourth node; and verifying that the first copy of the blockchain ledger matches the second copy of the blockchain ledger.

6. The one or more media of claim 1, further storing instructions which, when executed by one or more processors, cause:

initiating a transaction, using at least a fourth node of the plurality of nodes, to use the first associated funding type to obtain funding using the first invoice.

7. The one or more media of claim 1, wherein the prediction model comprises a subsidiary model that predicts a percentage discount at which the invoice would be paid, by a debtor associated with the invoice, before a due date associated with the invoice.

8. The one or more media of claim 1, wherein the prediction model comprises a subsidiary model that predicts a percentage loss at which the invoice would be purchased, by a third party, before a due date associated with the invoice.

9. The one or more media of claim 1, wherein selecting the first invoice without selecting the second invoice is responsive to determining that the first predicted cost for the first invoice is less than the second predicted cost for the second invoice.

10. The one or more media of claim 1, wherein the first set of information associated with the first plurality of invoices comprises:

a transaction committed on the blockchain ledger indicating that a third invoice was sold to a third party at a particular loss.

11. The one or more media of claim 1, wherein the second set of information associated with the first invoice comprises:

a transaction committed on the blockchain ledger indicating that a debtor associated with the first invoice made a payment on a third invoice to another entity before a due date of the third invoice.

12. The one or more media of claim 1, further storing instructions which, when executed by one or more processors, cause:

generating a second recommendation for obtaining the target funding amount, by the target funding date, using a second subset of the second plurality of invoices issued by the particular entity, wherein the second recommendation indicates using both the first invoice and the second invoice.

13. The one or more media of claim 1, wherein the recommendation indicates an amount of funding to be obtained from each of a plurality of funding types.

14. The one or more media of claim 13, wherein the plurality of funding types comprises at least two of: early payment of an invoice, invoice factoring, and line of credit.

15. The one or more media of claim 1, further storing instructions which, when executed by one or more processors, cause:

verifying that the blockchain ledger including the first set of information is valid, wherein verifying that the blockchain ledger is valid comprises:

verifying that data of a particular block matches a first hash of the particular block as stored by the particular block;

verifying that the first hash of the particular block as stored by the particular block matches a second hash of the particular block as stored by another block following the particular block;

obtaining a first copy of the blockchain ledger from the first node;

obtaining a second copy of the blockchain ledger from a fourth node; and verifying that the first copy of the blockchain ledger matches the second copy of the blockchain ledger;

initiating a transaction, using at least a fifth node of the plurality of nodes, to use the first associated funding type to obtain funding using the first invoice; and generating a second recommendation for obtaining the target funding amount, by the target funding date, using a second subset of the second plurality of invoices issued by the particular entity, wherein the second recommendation indicates using both the first invoice and the second invoice;

wherein:

the first node, the second node, the third node, and the fifth node are the same;

the prediction model comprises a first subsidiary model to predict a percentage discount at which the invoice would be paid, by a debtor associated with the invoice, before a due date associated with the invoice;

the prediction comprises a second subsidiary model to predict a percentage loss at which the invoice would be purchased before the due date associated with the invoice;

selecting the first invoice without selecting the second invoice is responsive to determining that the first predicted cost for the first invoice is less than the second predicted cost for the second invoice;

the first set of information associated with the first plurality of invoices comprises: a transaction committed on the blockchain ledger indicating that a third invoice was sold at a particular loss;

the second set of information associated with the first invoice comprises: a transaction committed on the blockchain ledger indicating that a debtor associated with the first invoice made a payment on a third invoice to another entity before a due date of the third invoice; and the recommendation indicates an amount of funding to be obtained from each of a plurality of funding types, wherein the plurality of funding types comprises at least two of: early payment of an invoice, invoice factoring, and line of credit.

16. A method, comprising:

obtaining, from at least a first node of a plurality of nodes, a first set of information associated with a first plurality of invoices;

wherein each of the plurality of nodes maintains a respective copy of a same blockchain ledger;

wherein the blockchain ledger comprises a plurality of blocks, each block comprising one or more transactions, and each block associated with a preceding block based on a hash of the preceding block;

wherein the blockchain ledger comprises at least one transaction associated with each of the first plurality of invoices;

iteratively training a machine learning algorithm using the first set of information associated with the first plurality of invoices as training data, wherein the machine learning algorithm generates a prediction model;

determining, using the prediction model, a predicted lowest cost of obtaining funding using an invoice and an associated funding type;

obtaining a target funding amount and a target funding date of a particular entity;

generating a recommendation for obtaining the target funding amount, by the target funding date, using a subset of a second plurality of invoices issued by the particular entity, wherein the generating the recommendation comprises:

obtaining, from at least a second node of the plurality of nodes, a second set of information associated with a first invoice of the second plurality of invoices;

obtaining, from at least a third node of the plurality of nodes, a third set of information associated with a second invoice of the second plurality of invoices;

determining, by applying the prediction model to the second set of information (a) a first predicted lowest cost of obtaining funding, by the target funding date, using the first invoice and (b) a first associated funding type;

determining, by applying the prediction model to the third set of information (a) a second predicted lowest cost of obtaining funding, by the target funding date, using the second invoice and (b) a second associated funding type; wherein the first associated funding type and the second associated funding type are different;

based on a comparison of the first predicted lowest cost and the second predicted lowest cost, selecting the first invoice for obtaining the target funding amount of the particular entity, without selecting the second invoice for obtaining the target funding amount of the particular entity; and presenting, at an interface, the recommendation for obtaining the target funding amount by the target funding date using the first invoice, without using the second invoice;

wherein the method is performed by at least one device including a hardware processor.

17. The method of claim 16, further comprising:

verifying that the blockchain ledger including the first set of information is valid.

18. A system, comprising:

at least one device including a hardware processor; and the system performing operations comprising:

obtaining, from at least a first node of a plurality of nodes, a first set of information associated with a first plurality of invoices;

wherein each of the plurality of nodes maintains a respective copy of a same blockchain ledger;

wherein the blockchain ledger comprises a plurality of blocks, each block comprising one or more transactions, and each block associated with a preceding block based on a hash of the preceding block;

wherein the blockchain ledger comprises at least one transaction associated with each of the first plurality of invoices;

iteratively training a machine learning algorithm using the first set of information associated with the first plurality of invoices as training data, wherein the machine learning algorithm generates a prediction model;

determining, using the prediction model, a predicted lowest cost of obtaining funding using an invoice and an associated funding type;

obtaining a target funding amount and a target funding date of a particular entity;

generating a recommendation for obtaining the target funding amount, by the target funding date, using a subset of a second plurality of invoices issued by the particular entity, wherein the generating the recommendation comprises:

obtaining, from at least a second node of the plurality of nodes, a second set of information associated with a first invoice of the second plurality of invoices;

obtaining, from at least a third node of the plurality of nodes, a third set of information associated with a second invoice of the second plurality of invoices;

determining, by applying the prediction model to the second set of information to determine (a) a first predicted lowest cost of obtaining funding, by the target funding date, using the first invoice and (b) a first associated funding type;

determining, by applying the prediction model to the third set of information to determine (a) a second predicted lowest cost of obtaining funding, by the target funding date, using the second invoice and (b) a second associated funding type;

wherein the first associated funding type and the second associated funding type are different;

based on a comparison of the first predicted lowest cost and the second lowest predicted cost, selecting the first invoice for obtaining the target funding amount of the particular entity, without selecting the second invoice for obtaining the target funding amount of the particular entity; and presenting, at an interface, the recommendation for obtaining the target funding amount by the target funding date using the first invoice, without using the second invoice.

19. The system of claim 18, wherein the operations further comprise:

verifying that the blockchain ledger including the first set of information is valid.

20. The one or more media of claim 1, wherein the operations further comprise:

initiating a transaction, using at least a fourth node of the plurality of nodes, to use the first associated funding type to obtain funding using the first invoice.

21. The one or more media of claim 1, wherein:

the first plurality of invoices and the second plurality of invoices are associated with invoice information, and the invoice information of individual invoices of the first plurality of invoices and the second plurality of invoices comprises: information describing a sale transaction and information describing terms of payment for the sales transaction.

22. The one or more media of claim 21, wherein the terms of payment include: an amount due, a due date, and an early payment discount or a late payment penalty.

23. The method of claim 16, wherein:

the first plurality of invoices and the second plurality of invoices are associated with invoice information, and the invoice information of individual invoices of the first plurality of invoices and the second plurality of invoices comprises: information describing a sale transaction and information describing terms of payment for the sales transaction.

24. The method of claim 23, wherein the terms of payment include: an amount due, a due date, and an early payment discount or a late payment penalty.

25. The system of claim 18, wherein:

the first plurality of invoices and the second plurality of invoices are associated with invoice information, and the invoice information of individual invoices of the first plurality of invoices and the second plurality of invoices comprises: information describing a sale transaction and information describing terms of payment for the sales transaction.

26. The system of claim 25, wherein the terms of payment include: an amount due, a due date, and an early payment discount or a late payment penalty.

27. The one or more media of claim 1, wherein the comparison of the first predicted lowest cost and the second predicted lowest cost comprises:

determining a lower cost between (a) a discount associated with first predicted lowest cost and (b) a loss associated with the second predicted lowest cost.

28. The method of claim 16, wherein the comparison of the first predicted lowest cost and the second predicted lowest cost comprises:

determining a lower cost between (a) a discount associated with first predicted lowest cost and (b) a loss associated with the second predicted lowest cost.

29. The system of claim 18, wherein the comparison of the first predicted lowest cost and the second predicted lowest cost comprises:

determining a lower cost between (a) a discount associated with first predicted lowest cost and (b) a loss associated with the second predicted lowest cost.

* * * * *

UNITED STATES PATENT AND TRADEMARK OFFICE
CERTIFICATE OF CORRECTION

PATENT NO. : 11,887,037 B2
APPLICATION NO. : 16/279708
DATED : January 30, 2024
INVENTOR(S) : Haimes It is certified that error appears in the above-identified patent and that said Letters Patent is hereby corrected as shown below:

In the Claims

In Column 25, Line 5, in Claim 1, delete "information" and insert -- information, --, therefor.

In Column 25, Line 10, in Claim 1, delete "information" and insert -- information, --, therefor.

Signed and Sealed this
Fourteenth Day of May, 2024

Katherine Kelly Vidal
*Director of the United States Patent and Trademark Office*